United States Patent [19]
Chambers

[11] 3,783,369
[45] Jan. 1, 1974

[54] VOLTAGE COMPENSATED ELECTRICAL CONTROL SYSTEM

[75] Inventor: William W. Chambers, Anaheim, Calif.

[73] Assignee: Robertshaw Controls Company, Richmond, Va.

[22] Filed: Nov. 5, 1971

[21] Appl. No.: 196,009

[52] U.S. Cl. ............. 323/22 SC, 165/39, 236/1 F, 236/78 A, 307/252 N, 323/40, 323/75 E, 323/75 N
[51] Int. Cl. ........................................... G05f 1/44
[58] Field of Search .................. 323/19, 225 C, 40, 323/75 E, 75 N, 75 L; 236/1 C, 1 F, 70, 78 A; 307/252 N; 219/499; 165/39

[56] References Cited
UNITED STATES PATENTS

| | | | |
|---|---|---|---|
| 3,211,214 | 10/1965 | Chambers | 236/78 A |
| 3,489,881 | 1/1970 | Chambers | 219/499 |
| 3,543,840 | 12/1970 | Chambers | 165/39 |
| 3,488,757 | 1/1970 | Chaparro | 323/75 N |

*Primary Examiner*—Gerald Goldberg
*Attorney*—Vern Schooley et al.

[57] ABSTRACT

A voltage compensated electrical control system for connection to an AC source and including a gate controlled rectifier, compensating resistor connected with the source and cathode of the rectifier and voltage control means responsive to a selected voltage to be rendered conductive to initiate current flow through the resistor in proportion to the magnitude by which the selected voltage is exceeded to modify the signal imposed between the gate and cathode to compensate for the source voltage changes to prevent erratic triggering of the SCR as a result of voltage changes.

12 Claims, 6 Drawing Figures

PATENTED JAN 1 1974  3,783,369

INVENTOR.
WILLIAM W. CHAMBERS
BY Fulwider, Patton, Rieber, Lee and Utecht
ATTORNEYS

VOLTAGE COMPENSATED ELECTRICAL CONTROL SYSTEM

BACKGROUND OF THE INVENTION

1. Field of the Invention

The present invention relates to an electrical control system including a voltage compensator to compensate for voltage fluctuations from an AC source to prevent erratic triggering of a rectifier and for controlling the angle in each cycle when such rectifier triggers.

2. Description of the Prior Art

Voltage control devices such as diodes have been proposed for controlling current through voltage divider resistors to regulate the gate-cathode voltage of silicon controlled rectifiers but such systems suffer the shortcomings that they are relatively expensive to manufacture and do not provide any significant capability for controlling the angle at which the rectifier is first triggered in each cycle.

SUMMARY OF THE INVENTION

The voltage compensated electrical control system of present invention is characterized by a gate controlled rectifier having a compensating circuit connected with the triggering circuit thereof which includes a voltage control means and a compensating resistor and wherein such circuit is responsive to fluctuations in source voltage to alter the signal imposed on the triggering circuit to thereby prevent accidental triggering of the rectifier. The compensating circuit may be designed to control the minimum conduction angle at which the rectifier is triggered in each cycle of an AC.

The objects and advantages of the present invention will become apparent from a consideration of the following dtailed description when taken in conjunction with the accompanying drawings.

DESCRIPTION OF THE PREFERRED EMBODIMENT

Figure 1:
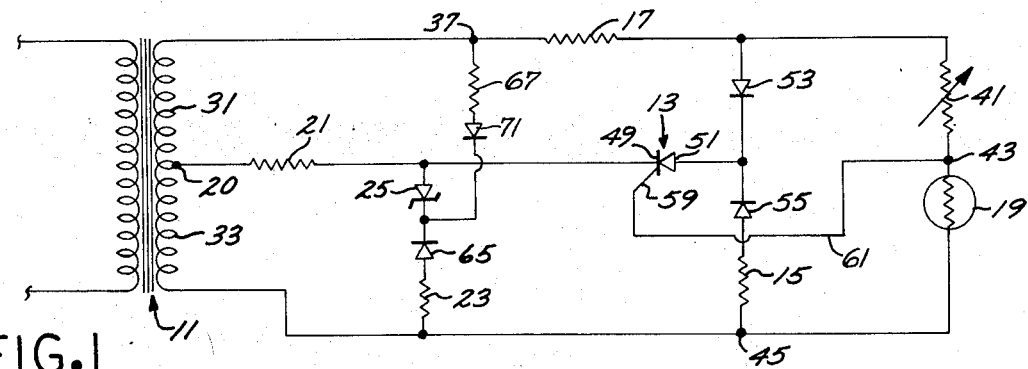
FIG. 1 is a schematic view of a voltage compensated electrical system embodying the present invention.

The voltage compensated control system of present invention may be connected with an AC source and includes, generally, a temperature responsive bridge incorporating a center tapped secondary coil of a transformer 11 and a silicon controlled rectifier (SCR) 13 which is responsive to temperatures sensed by a sensor 19 to control current flow through respective actuator resistors 15 and 17 which control respective cooling and heating systems (not shown). Connected from the center tap to the cathode of the SCR 13 is a compensating resistor 21 and connected between the cathode and one side of the secondary coil of the transformer 11 is a series-connected signal shaping resistor 23 and a zener diode 25. Consequently, when the voltage across the zener diode 25 exceeds the reverse voltage breakdown thereof, such zener diode will be rendered conductive in proportion to the amount by which the breakdown voltage is exceeded thereby producing a proportionate voltage drop across the compensating resistor 21. Thus, if the reverse breakdown voltage of the zener diode 25 is exceeded and a source voltage surge is imposed thereon before the triggering level of the SCR 13 is reached, current flow through the current limiting resistor 23 and compensating resistor 21, when the top end of the transformer 11 is positive with respect to the bottom end, will be increased in proportion to the magnitude by which the voltage imposed across the zener diode 25 exceeds the breakdown voltage thereof to produce a proportional voltage drop across the compensating resistor to thereby compensate for such surge to prevent application of the surge voltage to the triggering circuit of the SCR 13 thereby preventing false triggering of such SCR.

The bridge circuit shown in FIG. 1 is particularly adapted for use in a solid state thermostat to control a heating system and a cooling system in response to environmental temperature changes sensed by the sensor 19 which is in the form of a negative temperature coefficient resistor, or thermistor. The secondary coil of the transformer 11 is center tapped at 20 to form upper and lower halves defining bridge legs 31 and 33. The upper end of the transformer secondary coil is connected through a node 37 to one end of the heating resistor 17 and the opposite end of such resistor is connected with one end of a temperature adjustment potentiometer 41, the opposite end of such potentiometer being connected with the temperature sensor 19 through a node 43. The opposite side of the temperature sensor 19 is then connected through a node 45 to the lower end of the secondary coil of the transformer 11. The transformer secondary coil tap 20 is connected through the compensating resistor 21 to the cathode 49 of the SCR 13, with the anode 51 of such SCR being connected through oppositely facing diodes 53 and 55 to the respective heating and cooling sides of the bridge. The cooling resistor 15 is connected in series with the diode 55. The gate 59 of the SCR 51 is connected with the node 43 by means of a lead 61.

Connected in series with the current limiting resistor 23 and zener diode 25 is a blocking diode 65. A second current limiting and wave shaping resistor 67 is connected between the heating side of the bridge system and the cooling side of the zener diode 25 by means of a lead 69 and a second blocking diode 71.

In order not to have an excessive effect on the width of the dead band, i.e., band where the temperature responsive bridge is balanced and the SCR 13 nonconductive, the zener diode 25 is selected to have a reverse breakdown voltage slightly less than the voltage imposed thereon when the AC source is at its minimum expected peak voltage.

The preferred embodiment of the control system of present invention is particularly useful for controlling a modulating gas valve (not shown) that controls the gas flow rate to a furnace in proportion to the magnitude by which the temperature sensed by the thermistor 19 drops below the target temperature. With this arrangement the degree of gas valve opening is increased with the increases in temperature of the heating resistor 17. Accordingly, when there is a call for heat, it is desirable to increase the time period during each AC cycle during which the SCR 13 is conductive in proportion to the unbalance of the bridge. This is conveniently accomplished by selecting a current limiting resistor 67 which has a relatively high resistance, as for instance 82 ohms, to thereby limit current flow through the compensating resistor 21 as described hereinafter.

On the other hand, the cooling resistor 15 actuates an on-off switch that controls an air conditioning compressor, and it is desirable to have such switch latch positively on or off when actuated to thereby avoid rapid on and off cycling of the compressor and consequent damage to the compressor drive motor. Thus, when there is a call for cooling it is desirable to trigger the SCR 13 well off the 90° conduction angle point as will be made clear hereinafter. This is accomplished by selecting a cooling side current limiting resistor 23 that has a resistance which is relatively low as compared to the resistance of the heating side limiting resistor 67, as for instance 27 ohms.

In operation, when the control system of present invention is energized and the environment in which the thermistor 19 is placed remains within the desired temperature range, the bridge will remain substantially balanced and will not impose a sufficient triggering signal between the cathode 49 and gate 59 of the SCR 13 to initiate triggering thereof. If the environment then commences cooling and cools the thermistor 19, the resistance thereof will be increased and when the top end of the transformer 11 is positive with respect to the bottom end thereof, the node 43 will be positive with respect to the node 20 thereby driving the gate 59 positive with respect to the cathode 49. When the thermistor 29 becomes sufficiently cooled to unbalance the bridge sufficiently to trigger the SCR 13, such SCR will be rendered conductive to permit current flow from the top end of the secondary transformer coil through the heating resistor 17, diode 53 and through the power circuit of such SCR.

When such furnace heats the environment sufficiently to warm the thermistor 19 sufficiently to decrease the resistance thereof and re-balance the bridge, triggering of the SCR 13 will be discontinued to discontinue current flow in the heating resistor 17 to de-energize the furnace (not shown).

Figure 2:
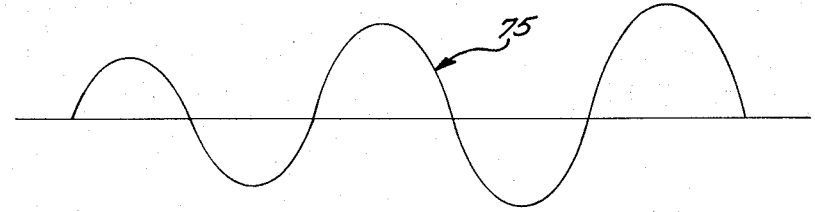
FIG. 2 is a schematic view of a signal imposed on the power circuit of a rectifier included in the system shown in FIG. 1.
Figure 3:
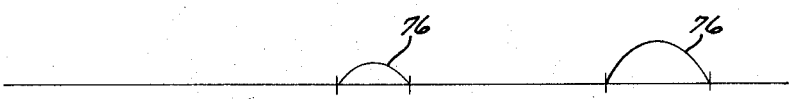
FIG. 3 is a schematic view of a signal developed in the cathode lead of the rectifier included in the system in FIG. 1.
Figure 4:
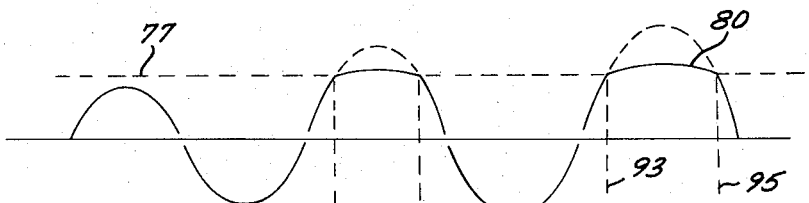
FIGS. 4 and 5 are schematic views of a signal imposed between the gate and cathode of a rectifier included in the system shown in FIG. 1 for high and low value limiting resistors, respectively.

With continued reference to FIGS. 2 - 4, it will be appreciated that during bridge unbalance the resistor 67 presents sufficient resistance to current flow to prevent sufficient current from flowing through the compensating resistor 21 to create a greater voltage drop thereacross than that by which the source to gate voltage exceeds the threshold voltage 77 to thereby maintain the solid line apexes of the curve 80 convex upwardly to form the peak at 90° conduction angle and assure that the triggering signal imposed between the gate 59 and cathode 49 causes triggering of the SCR 13 at increasingly earlier times in each cycle in proportion to the degree of unbalance of the bridge. This feature is utilized in practice by utilizing a heating operator, such as a thermostatic switch disposed in heat exchange relationship with the resistor 17 and responsive to the higher temperature resulting from the larger conduction angle for the SCR 13 to remain closed for longer periods of time to thereby cause a controlled modulating gas valve (not shown) that controls gas flow to a furnace to open proportionately to a greater degree.

When the environment has been heated sufficiently to warm the sensor 19 sufficiently to re-balance the bridge, the SCR 13 will be rendered non-conductive to cool the resistor 17 and close such gas valve. If the environmental temperature subsequently rises sufficiently to heat the sensor 19 above the selected temperature range, the resistance of such sensor will be decreased sufficiently to unbalance the bridge and cause the node 43 to be driven sufficiently positive with respect to the center tap node 20 when the bottom of the transformer 11 is positive with respect to the top end to produce a gating voltage between the gate 59 and cathode 49. Such gating voltage will trigger the SCR 13 and initiate current flow on alternate half cycles through the cooling operator heat motor 15, diode 55 and SCR back to the center tap 29, it being realized that the diode 53 serves to block current flow directly from the cooling heat motor 15 to the heating heat motor 17.

Figure 5:
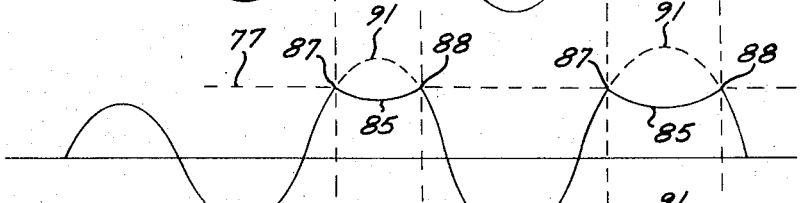

It will be appreciated that as the line voltage increases and the voltage across the zener diode 25 exceeds the threshold voltage 83 thereof, current flow will be initiated from the node 45 through the limiting resistor 23, diode 65 and zener diode 25 and the compensating resistor 21 to produce a compensating voltage drop across such compensating resistor similar to the pulse 76 shown in FIG. 3 to produce the curve 87 shown in FIG. 5.

Again, this compensating voltage is subtracted from the gate-to-cathode voltage that would otherwise be experienced to produce the scallops or scoops 85 (FIG. 5) in the peaks and since the depth of such scoops is proportional to the voltage across the compensating resistor 21, any voltage surges from the transformer 11 will not only increase the bridge unbalance as applied between the source and gate, but will increase the voltage drop between the source and cathode thereby tending to cancel the differences between such increases in voltage drops to produce substantially no resultant differences in voltage difference between the gate 59 and cathode 49. Once the SCR 13 has been triggered, changes in the gate-cathode voltage have no further effect thereon.

It will be appreciated that the scoops 85 create points 87 and 88 on opposite sides of the 90° sinusiodal peak 91 thereby assuring that the triggering voltage reaches a maximum at one of these peaks. Accordingly, once the triggering level of the SCR 13 is reached such will be triggered at either the early voltage peak 87 or late voltage peak 88. If it is triggered by the late voltage peak 88, it will remain conductive for only a short period of time and no appreciable power will be conducted therethrough. However, when the SCR 13 is triggered by the early peak 87, the SCR will remain conductive for nearly a full cycle to thereby deliver full power. While changes in source voltage will alter the distance between the peaks 87 and 88, it is important to note that it will not effect the magnitude thereof.

In many systems when the sinusiodal triggering wave imposed on the triggering circuit of an SCR approaches the triggering level thereof, such SCR will be triggered at exactly 90° as represented by the positive peak of the unmodified sinusiodal triggering signal. In many cases the direct load (for example a blower relay) applies a full wave load to the transformer which in turn will lower the transformer output voltage and consequently the trigger voltage applied on subsequent cycles. This will cause the SCR to fail to trigger and result in shut-off of the "full wave load" resulting in pulsing.

However, with the wave shape shown in FIG. 4 this problem will be minimized and in the wave shape shown in FIG. 5 it will be eliminated since the change in line voltage results only in a change in the distance between peaks 87 and 88 rather than in a change in voltage level. This is because if the amplitude of the triggering voltage is reduced by bringing the load 15 or 17 into circuit, the amount of voltage which the compensating resistor 21 subtracts from the voltage imposed between the nodes 20 and 43 is proportionally reduced thereby resulting in the peaks 87 remaining at the same level to assure triggering of the SCR 13 on the subsequent cycle.

In practice, on the first cycle to reach the triggering level, the point 88 may be the only point on the signal 81 of sufficient magnitude to trigger the SCR 13 but the relatively short conduction angle resulting from such triggering will only provide negligible power to the load 17 and on the subsequent cycle the point 87 will have reached sufficient magnitude to trigger the SCR 13 early in the cycle to produce a longer conduction angle and the SCR 13 will be triggered each cycle thereafter until the bridge is again balanced.

Figure 6:
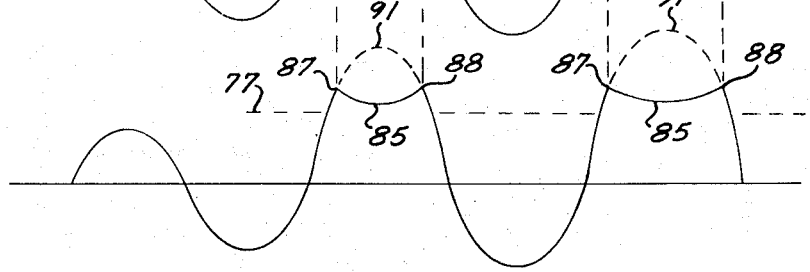
FIG. 6 is a schematic view similar to FIG. 5 but showing the signal for greater magnitudes of system unbalance.

With further increases in bridge unbalance, as opposed to increase in line voltage, the height of the points 87 and 88 above the zero voltage line increases, but the horizontal distance between such points as represented by the distance between the two broken vertical lines 93 and 95 in FIGS. 5 and 6 does not change.

However, the increase in magnitude resulting from increased unbalance does increase the conduction angle since the magnitude of the sine wave 81 increases thereby resulting in the sides of such sine wave becoming steeper and the point at which the voltage exceeds the SCR triggering voltage occurs earlier in the cycle. While this change is generally too small to operate a modulating device through the required range, it can be used, for example, to operate a second stage air conditioner to produce a more cooling effect to thereby tend to rebalance the bridge more rapidly. While a control system including both heating operator and cooling operator resistors 17 and 15 has been described, it will be appreciated that only one such resistor is necessary for proper operation of either a heater or cooler only and that the method will also work for a non-bridge type application.

From the foregoing it will be appreciated that the electrical control system of present invention provides a particularly effective means for shaping the triggering curve imposed on an SCR and for compensating for voltage surges imposed thereon to prevent false triggering thereof as a consequence of such surges.

Various modifications and changes may be made with regard to the foregoing detailed description without departing from the spirit of the invention.

What is claimed is:

1. A voltage compensated electrical control system comprising:
   a voltage source for producing a pulsating wave;
   gate controlled rectifier means for connection with said voltage source and responsive to a signal in its triggering circuit of a predetermined voltage to have its switch circuit rendered conductive;
   a first actuator connected with the switch circuit of said rectifier means;
   sensing means connected with the gate of said rectifier means and responsive to a selected condition to impose said perdetermined voltage on said gate;
   compensating resistor means connected in the triggering circuit of said rectifier means;
   voltage control means for connection with said voltage source and connected with said compensating resistor means and operative upon the attainment thereacross of a selected voltage to be rendered conductive in proportion in the magnitude by which said selected voltage is exceeded to provide for current flow through said compensating resistor means in proportion to said magnitude whereby when the triggering signal on said triggering circuit as modified by said compensating resistor exceeds said rectifier triggering voltage said controlled rectifier will be rendered conductive to initiate current flow through said actuator and when voltage changes are imposed by said source, the current flow through said compensating resistor means will be altered in proportion to said voltage changes to produce a corresponding compensating voltage differential across said resistance means to alter the triggering voltage imposed on said triggering circuit accordingly to thereby compensate for said voltage changes and prevent erratic triggering of said rectifier means as a result of said voltage changes.

2. A voltage compensated electrical control system as set forth in claim 1 wherein:
   said voltage control means is in the form of a zener diode.

3. A voltage compensated electrical control system as set forth in claim 1 that includes:
   current blocking means connected in series with said voltage control means.

4. A voltage compensated electrical control system as set forth in claim 1 wherein:
   said sensing means is in the form of a temperature sensor; and
   said actuator is responsive to triggering of said rectifier means to actuate a temperature change unit.

5. A voltage compensated electrical control system as set forth in claim 1 wherein:
   said voltage is in the form of a center tapped coil having said power circuit connected between one side of said coil and said center tap and said system includes:
   a second actuator connected between the side of said coil opposite said one side and said switch circuit; and
   lead means connecting the opposite sides of said coil with one side of said voltage control means whereby said first actuator may be operated by the voltage received from one half of said coil and said second actuator may be operated by the voltage received from the other half of said coil.

6. A voltage compensated electrical control system as set forth in claim 1 wherein:
   said voltage source produces a cyclic wave having rounded peaks; and
   said compensating circuit means includes sufficient resistance to draw sufficient current therethrough to produce a sufficient voltage differential across te compensating resistor to reduce the amplitude of said peaks sufficiently to provide a resulting triggering signal having concave apexes.

7. A voltage compensated electrical control system as set forth in claim 1 wherein:
said voltage source produces a rounded wave having rounded peaks and said system includes;
dividing resistance means in series with said current control means for limiting the current through said compensating resistance means sufficiently to slightly flatten the cyclic peaks of said triggering voltage while maintaining said peaks convex upwardly.

8. A voltage compensating electrical control system as set forth in claim 1 wherein:
said rectifier means is in the form of an SCR having its cathode-anode circuit connected with said operator and its gate-cathode circuit connected with said current control means.

9. A voltage compensating electrical control system as set forth in claim 1 wherein:
said power source is in the form of a center tapped coil;
said actuator is in the form of a temperature responsive resistor; and
said circuit means includes a bridge responsive to a selected change in temperature of said temperature responsive resistor to actuate said actuator.

10. A voltage compensating electrical control system as set forth in claim 5 wherein:
said first actuator is in the form of a heating system actuating element;
said second actuator is in the form of a cooling system actuating element;
said sensing means is in the form of a temperature sensing element; and
system means includes a temperature responsive bridge that is responsive to cooling of said temperature sensing element below a selected temperature range to trigger said rectifier means and initiate current flow through said first actuator and is responsive to heating of said temperatures sensor above said temperature range to trigger said rectifier means and initiate current flow through said second actuator.

11. A voltage compensating temperature system as set forth in claim 1 wherein:
said voltage control means is responsive to a selected voltage at least equal to said predetermined voltage to be rendered conductive.

12. A voltage compensated electrical control system as set forth in claim 1 wherein:
said voltage source produces a cyclic wave having rounded peaks; and
said compensating resistor means includes sufficient resistance to conduct sufficient current therethrough at voltages above said predetermined voltage to produce a sufficient voltage differential across the compensating resistor means to reduce the amplitude of said peaks sufficiently to provide a resulting triggering signal having concave apexes.

* * * * *